(12) United States Patent
Agarwal et al.

(10) Patent No.: US 9,990,404 B2
(45) Date of Patent: Jun. 5, 2018

(54) SYSTEM AND METHOD FOR IDENTIFYING TRENDING TOPICS IN A SOCIAL NETWORK

(71) Applicant: Microsoft Technology Licensing, LLC, Redmond, WA (US)

(72) Inventors: Deepak Agarwal, Sunnyvale, CA (US); Bee-Chung Cheng, San Jose, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 269 days.

(21) Appl. No.: 14/168,924

(22) Filed: Jan. 30, 2014

(65) Prior Publication Data

US 2015/0213022 A1 Jul. 30, 2015

(51) Int. Cl.
G06F 17/30 (2006.01)
H04L 29/08 (2006.01)
G06Q 10/10 (2012.01)
G06Q 50/00 (2012.01)

(52) U.S. Cl.
CPC .... G06F 17/3053 (2013.01); G06F 17/30525 (2013.01); G06F 17/30528 (2013.01); G06F 17/30867 (2013.01); G06Q 10/10 (2013.01); G06Q 50/01 (2013.01); H04L 67/22 (2013.01)

(58) Field of Classification Search
CPC .......... G06F 17/3053; G06F 17/30867; G06F 17/30525; G06F 17/30528; G04L 67/22; G04L 65/403; H04L 67/22; H04L 67/306; G06Q 50/01; G06Q 10/10
USPC ....................................... 707/731
See application file for complete search history.

(56) References Cited

U.S. PATENT DOCUMENTS

| 7,792,786 B2* | 9/2010 | Chen ................. G06F 17/30705 707/603 |
| 2007/0198510 A1* | 8/2007 | Ebanks ................. G06Q 30/02 |
| 2008/0077574 A1† | 3/2008 | Gross |
| 2008/0140506 A1* | 6/2008 | Christianson .......... G06Q 30/02 705/14.44 |
| 2008/0270552 A1* | 10/2008 | Flake ..................... G06Q 30/02 709/206 |

(Continued)

OTHER PUBLICATIONS

Booth, Norman, et al., "Mapping and Leveraging Influencers in Social Media To Shape Corporate Brand Perceptions", Conf. on Corporate Communication, Wroxton College, Wroxton, England, Jun. 4-7, 2010, pp. 16-25.*

(Continued)

*Primary Examiner* — Robert Stevens
(74) *Attorney, Agent, or Firm* — Schwegman Lundberg & Woessner, P.A.

(57) ABSTRACT

A system and method optionally includes an electronic data storage configured to store content items introduced to a social network by a first user and to store interactions with the content items by second user of the social network. The system further includes a processor, coupled to the electronic data storage, configured to determine an influence of the first user based, at least in part, on the interaction by the second user with at least one of the content items as introduced by the first user and a characteristic of the second user and cause an indication of the influence of the first user to be displayed on a user interface.

20 Claims, 7 Drawing Sheets

(56) References Cited

U.S. PATENT DOCUMENTS

| | | | |
|---|---|---|---|
| 2009/0048904 A1* | 2/2009 | Newton | G06Q 30/0201 705/7.29 |
| 2012/0036127 A1* | 2/2012 | Work | G06Q 10/00 707/732 |
| 2012/0209920 A1* | 8/2012 | Neystadt | G06Q 30/0201 709/205 |
| 2012/0226748 A1* | 9/2012 | Bosworth | H04L 12/1813 709/204 |
| 2013/0013678 A1* | 1/2013 | Murthy | G06Q 30/0201 709/204 |
| 2013/0173572 A1* | 7/2013 | Colagiovanni | G06Q 50/01 707/706 |
| 2013/0198204 A1* | 8/2013 | Williams | G06F 17/30283 707/748 |
| 2013/0254283 A1* | 9/2013 | Garcia-Martinez | G06Q 50/01 709/204 |
| 2013/0262320 A1* | 10/2013 | Makanawala | H04L 51/32 705/304 |
| 2013/0297581 A1* | 11/2013 | Ghosh | G06F 17/30864 707/706 |
| 2014/0019539 A1* | 1/2014 | Novak | G06Q 30/0201 709/204 |
| 2014/0089323 A1* | 3/2014 | Wu | G06F 17/30861 707/748 |
| 2015/0074033 A1* | 3/2015 | Shah | G06N 5/02 706/46 |

OTHER PUBLICATIONS

Wang, G. Allan, et al., "ExpertRank: A topic-aware expert finding algorithm for online knowledge communities", Decision Support Systems, vol. 54, Issue 3, Feb. 2013, pp. 1442-1451.*

Li, Na, et al., "Identifying Influential Scholars in Academic Social Media Platforms", ASONAM '13, Niagara, Ontario, Canada, Aug. 25-29, 2013, pp. 608-614.*

Agarwal, Nitin, et al., "Identifying the Influential Bloggers in a Community", WSDM '08, Palo Alto, CA, Feb. 11-12, 2008, pp. 207-217.*

Kong, Shoubin, et al., "A Tweet-Centric Approach for Topic-Specific Author Ranking in Micro-Blog", ADMA 2011, Part I, LNAI 7120, Springer-Verlag, Berlin, Germany, © 2011, pp. 138-151.*

"FOAF Vocabulary Specification", downloaded from: http://xmlns.com/foaf/spec/20050603.html#sec-foafvocab, © 2005, pp. 1-34.*

The American Heritage College Dictionary, 4th Edition, Houghton Mifflin Co., Boston, MA, © 2002, pp. 303 and 491.*

\* cited by examiner
† cited by third party

SYSTEM AND METHOD FOR IDENTIFYING TRENDING TOPICS IN A SOCIAL NETWORK

TECHNICAL FIELD

The subject matter disclosed herein generally relates to the identification of influential users of a social network.

BACKGROUND

Social networks conventionally provide for member of the social network to post content to the social network for viewing by others. Content items such as webpages, documents, images, and the like may be posted to the social network. Users of the social network may access the content items to, for instance, open or otherwise view the webpage, document, image, and so forth. Thus, the social network may incorporate content items that are generally available on public networks, such as the Internet, as well as content that may originate from private sources.

BRIEF DESCRIPTION OF THE DRAWINGS

Some embodiments are illustrated by way of example and not limitation in the figures of the accompanying drawings.

DETAILED DESCRIPTION

Figure 1:
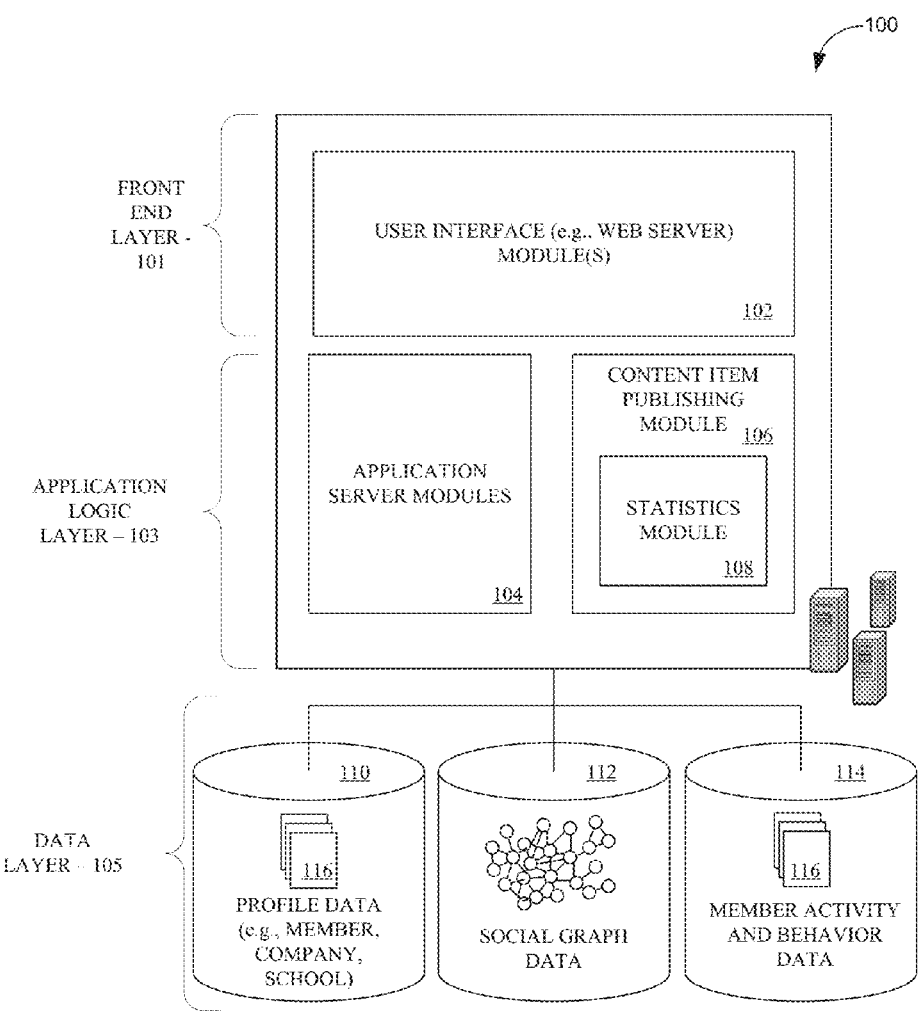
FIG. 1 is a block diagram illustrating various components or functional modules of a social network, in an example embodiment.

Example methods and systems are directed to identifying influential users of a social network. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

The content that gets posted to or "shared" on a social network may provide indications of what is popular with or of interest to users of the social network. While various social networks may obtain and provide statistics regarding content items that have been posted to the social network, such statistics may tend to focus on the content item itself rather than the larger context of the content item. Thus, a social network may generate provide a statistic as to how many times a content item has been shared on the social network, and may provide a statistic as to how that relates to other content items. Moreover, a social network may generate and provide a statistic regarding a provider of the content item, such as number of posts an individual user or entity (e.g., a company or group) may has done over a given period of time. Again, however, such statistics may be focused narrowly on an individual and may not be sensitive to context, such as characteristics of the entity and how or whether that characteristic provides insight into the manner in which the entity shares content items.

As such, various conventional social network statistics may indicate that a particular content item has been shared a particular number of times, and it may be inferred thereby that the content item itself is relatively popular. However, such a statistic does not indicate that content related to the content item is also popular or not, i.e., whether a particular content item is popular because an entire category of content related to the content item is popular, or because simply that particular content item is popular. Further, a conventional social network may indicate that a particular user posts relatively large numbers of content items or has relatively large numbers of other users and/or entities in their social graph (e.g., has many "contacts", "friends", or "followers", to reference a few well-known contemporary terms related to a social graph). However, such a statistic doesn't indicate a degree of overall influence of the user. A user with a large social graph but who posts content items that result in relatively little engagement on the social network may be relatively less influential in presenting content items on the social network than an user with a relatively smaller social graph whose posting of content items generates relatively large engagement with other users of the social network.

A system has been developed that generates and provides statistics related to the sharing of content items on a social network. Such statistics may consider shared content items and the users who share the content items in a context wider than just the content items and users themselves. Thus, rather than identifying that a content item has been shared a certain number of times or by a certain number of users, the statistics may relate to a topic related to the category or may identify users who are particularly influential in the social network.

In an example, content items may be categorized into categories or topics and statistics provided with respect to the category or topic (while a category may be understood as how content items may be organized while a topic may be understood to refer to the same or similar content within the content item, the terms "category" and "topic" may be utilized interchangeably herein). For instance, the content items may be categorized according to common words or phrases and/or origins of the content items, such as entities posting the content items, companies or organizations originating the content item, and the like. The system may identify categories or topics in the first instance without being restricted to topics that have been previously identified. The system may then note trends in the posting of content items related to such categories or topics, such as by noting that the sharing of content items related to the topic has increased or decreased. The system may incorporate information about content items from a sample set wider than the social network. Thus, the system may note that content items from a topic are relatively likely or unlikely to be shared on the social network.

Influential users and/or entities, collectively "influencers," may also be identified by the system. Influencers may be identified because content items with which they are associated may be relatively more likely to be shared on the social network and/or engaged with than other users. Thus, an influencer may be someone for whom shared content items are relatively likely to be viewed or re-shared by other users. An influencer may write or otherwise produce content items, such as an article or other document, that are relatively likely to be posted to the social network in the first instance. The system may identify an influencer in the first instance not only by a propensity for having content items associated with the influencer shared on the social network, but also according to characteristics of the user. Thus, a user who is a high ranking executive, a member of a prestigious organization, such as a university, think tank, company, and the like, or who is widely famous or otherwise known may be assessed as being relatively more influential than other users.

The sharing activities of identified influencers may be utilized in identifying relevant statistics in topics. If content items related to a particular topic are shared or not shared by an unusual number of influencers then the statistics related to the topic may be interpreted in a different manner. For instance, where the statistic is related to whether or not a topic is popular or trending up or down, whether or not identified influencers are sharing the content may be utilized by the system to adjust the assessment of the topic, meaning that a topic that would otherwise not necessarily be identified as popular or as popular may be identified as popular or as more popular because influencers are sharing associated content items than may otherwise be the case.

FIG. 1 is a block diagram illustrating various components or functional modules of a social network 100, consistent with some examples. A front end 101 consists of a user interface module (e.g., a web server) 102, which receives requests from various client-computing devices, and communicates appropriate responses to the requesting client devices. For example, the user interface module(s) 102 may receive requests in the form of Hypertext Transport Protocol (HTTP) requests, or other web-based, application programming interface (API) requests. An application logic layer 103 includes various application server modules 104, which, in conjunction with the user interface module(s) 102, may generate various user interfaces (e.g., web pages, applications, etc.) with data retrieved from various data sources in a data layer 105. In some examples, individual application server modules 104 may be used to implement the functionality associated with various services and features of the social network service. For instance, the ability of an organization to establish a presence in the social graph of the social network 100, including the ability to establish a customized web page on behalf of an organization, and to publish messages or status updates on behalf of an organization, may be services implemented in independent application server modules 104. Similarly, a variety of other applications or services that are made available to members of the social network service may be embodied in their own application server modules 104. Alternatively, various applications may be embodied in a single application server module 104.

In some examples, the social network 100 includes a content item publishing module 106, such as may be utilized to receive content, such as messages, posts, links, images, videos, and the like, and publish the content to the social network. The content item publishing module 106, or the social network 100 generally, may include a statistics module 108. As will be disclosed in detail herein, the statistics module 108 may monitor content items that have been or are being published by the content item publishing module 106 and identify statistics related to the content items, the users of the social network who post the content items, and categories and topics with which the content items may be associated, as will be described in detail herein. Additionally or alternatively, the statistics module 108 may be a component of the application server module 104 and\Vor the data layer 105. Details of the publishing of content items by the content item publishing module 106 may be stored in the data layer 105, as disclosed herein. The statistics module 108 may utilize data as stored in the data layer 105 and/or obtained directly from the content item publishing module 106.

As illustrated, the data layer 105 includes, but is not necessarily limited to, several databases 110, 112, 114, such as a database 110 for storing profile data, including both member profile data as well as profile data for various organizations. Consistent with some examples, when a person initially registers to become a member of the social network service, the person may be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 110. Similarly, when a representative of an organization initially registers the organization with the social network service, the representative may be prompted to provide certain information about the organization. This information may be stored, for example, in the database 110, or another database (not shown). With some examples, the profile data may be processed (e.g., in the background or offline) to generate various derived profile data. For example, if a member has provided information about various job titles the member has held with the same or different companies, and for how long, this information can be used to infer or derive a member profile attribute indicating the member's overall seniority level, or seniority level within a particular company. With some examples, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social network service. A "connection" may require a bi-lateral agreement by the members, such that both members acknowledge the establishment of the connection. Similarly, with some examples, a member may elect to "follow" another member. In contrast to establishing a connection, the concept of "following" another member typically is a unilateral operation, and at least with some examples, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph database 112.

The social network service may provide a broad range of other applications and services that allow members the opportunity to share and receive information, often customized to the interests of the member. For example, with some examples, the social network service may include a photo sharing application that allows members to upload and share photos with other members. With some examples, members may be able to self-organize into groups, or interest groups, organized around a subject matter or topic of interest. With some examples, the social network service may host various job listings providing details of job openings with various organizations.

As members interact with the various applications, services and content made available via the social network service, information concerning content items interacted with, such as by viewing, playing, and the like, etc.) may be monitored and information concerning the interaction may be stored, for example, as indicated in FIG. 1 by the database 114. Thus, interactions with a content item by various users of the social network 100 may be stored and utilized in determining a status of a user who posted the content item (i.e., an influence status or level of the user) and an overall popularity of the content item.

The profile data database 110 and the member activity database 114 may, among other sources in the social network 100, include or store events 116. Such events include but are not necessarily limited to the posting of content items, birthdays, anniversaries, change of status (employment, location, etc.), a publication, and a previous interaction. Such events may be stored automatically and/or may be stored on the basis of a user selection or choice.

Although not shown, with some examples, the social network 100 provides an application programming interface (API) module via which third-party applications can access various services and data provided by the social network service. For example, using an API, a third-party application may provide a user interface and logic that enables an authorized representative of an organization to publish messages from a third-party application to various content streams maintained by the social network service. Such third-party applications may be browser-based applications, or may be operating system-specific. In particular, some third-party applications may reside and execute on one or more mobile devices (e.g., phone, or tablet computing devices) having a mobile operating system.

Figure 2:
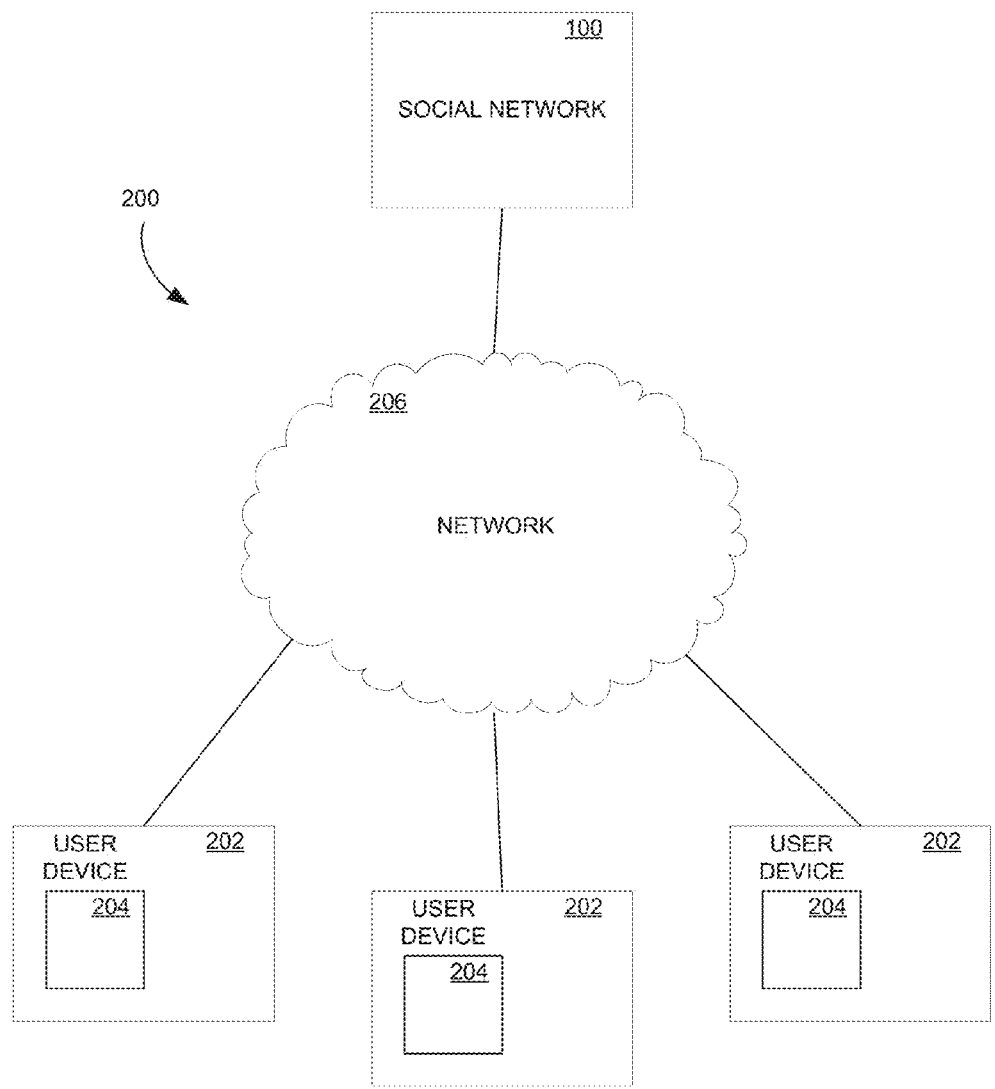
FIG. 2 is a block diagram of a system including a social network, in an example embodiment.

FIG. 2 is a block diagram of a system 200 including the social network 100. The system 200 includes user devices 202, such as personal computers, tablet computers, smartphones, personal digital assistants (PDAs), and any device which may be utilized to interact with a website, run an application, or otherwise perform computing operations to allow a user of the user device 202 to send and receive information with respect to the social network. The user devices 202 include a user interface 204 suitable to interact with the social network 100. The interaction may including posting content items to the social network 100 and interacting with content items that have been posted to the social network 100.

The user devices 202 and the social network 100 are communicatively coupled with one another via a network 206. The network 206 may be the Internet or other suitable network. The network 206 may include information resident on the network 206, such as content items which have not necessarily been posted to the social network 100. The social network 100 and the user devices 202 may access information included in the network 206.

Figure 3:
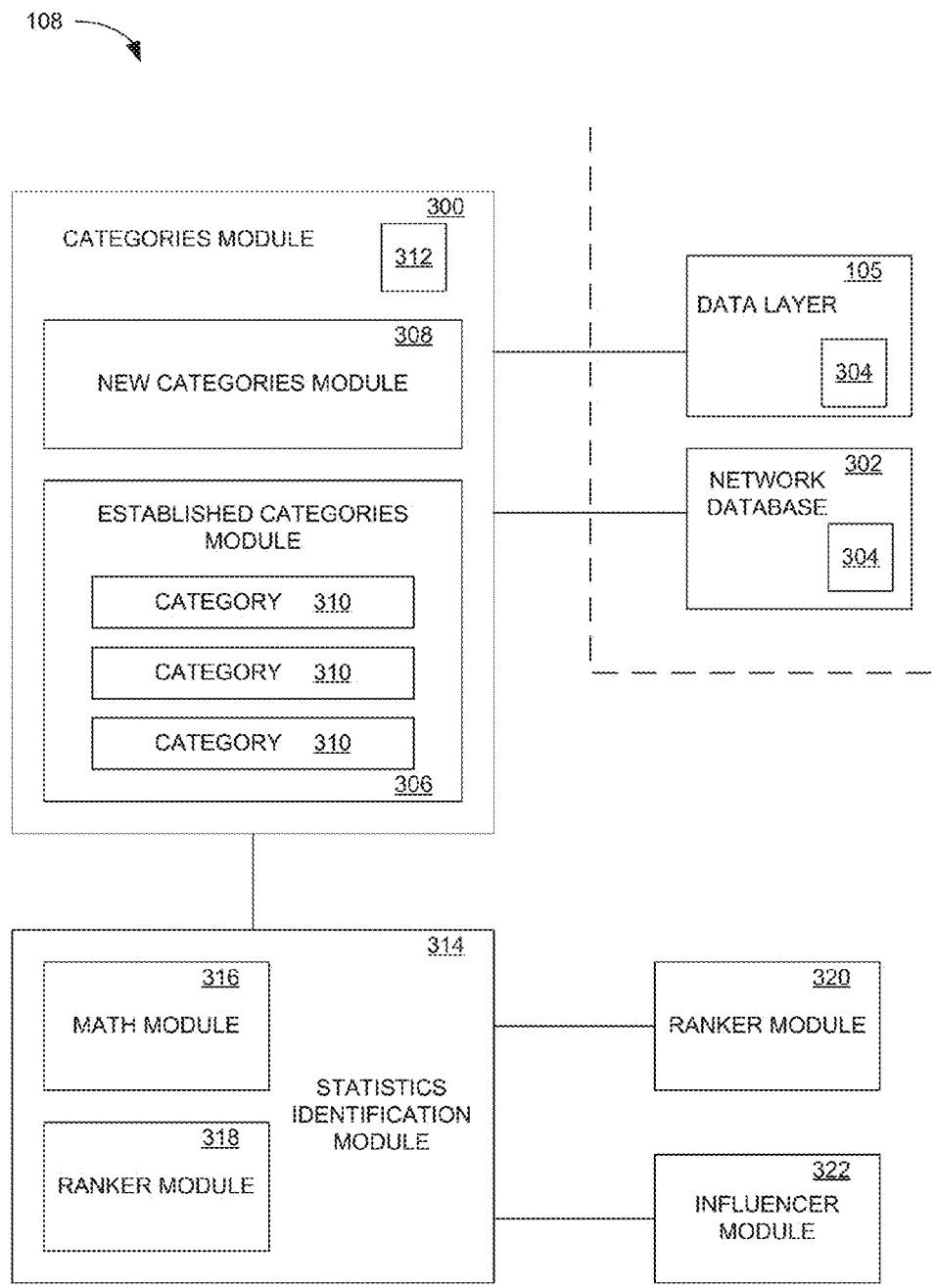
FIG. 3 is a detail block diagram of a statistics module and sources of content items that may be accessed by the statistics module, in an example embodiment.

FIG. 3 is a detail block diagram of the statistics module 108 and sources of content items that may be accessed by the statistics module 108. The statistics module 108 optionally includes a categories module 300 that is configured to access the data layer 105 as well as, optionally, a network database 302. The statistics module 108 further optionally variously includes a statistic identification module, an influencer module, and a ranker module, as disclosed herein.

The network database 302 may represent one or more databases or other sources of content items 304 that may be accessed via the network 206, such as information generally available on the Internet. Additionally or alternatively, the network database 302 may include information instead of or in addition to the content items 300, such as metadata related to the content items 304, such as a title, author or originating entity, address, date written, made available on the database 302, and/or accessed, and other forms of metadata known in the art. Additionally or alternatively, the network database 302 may further include data regarding various content items 304 as compiled and provided by a third party, such as a search engine or other Internet search or information provider. Information from the network database 302 may be accessed directly by the categories module 300 and the statistics module 108 generally or may be stored in the data layer 105.

Categories

The categories module 300 includes an established categories module 306 and a new categories module 308. The established categories module 306 may identify previously established categories 310 with which content items 304 may be associated and maintain such categories, as disclosed herein. The new categories module 308 may generate new categories 310 based on content items 304 as included in the data layer 105 and/or as obtained from the network database 302. A new category 310 having been generated, the established categories module 306 may proceed to manage the category 310. Alternatively or additionally, the new categories module 308 may manage the new category 310 until transferred to the established categories module 310, such as at a predetermined time or upon providing information based on the new category 310, as disclosed herein.

Categories 310 may correspond to topics, with categories 310 variously corresponding to specific topics and/or being combined to generate or correspond to a specific topic. Such topics may relate to people; companies or other organizations; places; things; past, current, and scheduled events; and so forth. Topics may also relate to combinations of topics or categories as disclosed herein. For instance, a topic may be people who work at a particular company, or a location for a product launch, and so forth. Thus, to the extent that content items 304 are organized into the categories 310, the resultant changes to the categories 310 may provide statistical data that is related to the topic in general.

As will be disclosed in detail, of a total population of content items 304 that are accounted for by the categories module 300 (e.g., whether just those content items 304 included in the social network 100, the content items 304 included in the system 200 at large, or any other group of content items 304 that may be designated or identified), a category 310 may account for a subset of the total population of content items 304. In various examples, a single content item 304 may be associated with more than one category 310. In various examples, not every content item 304 is necessarily associated with a category 310, such as when no category 310 relevant to the content item 304 has been created.

The categories module 300 may generate new categories 310 based on a comparison of characteristics of various content items 304 with respect to one another between and among content items 304. The categories module 300 may associate content items 304 with various categories 310 based on a comparison of the same or similar such characteristics with related characteristics of the categories 310 as established. While both processes will be described herein, it is to be understood that the principles outlined with respect to the generation of new categories 310 may be applicable in whole or in part to the association of content items 304 with established categories 310 and vice versa.

The categories module 300 may obtain content items 304 and/or data or metadata (herein collectively referred to as the content item 304) related to the content items and analyze the content items 304 for similarities in characteristics between them. In an example, the categories module 300 utilizes word (such as keywords) or phrase searches of the content items 304 to identify the same or similar words or phrases between the content items 304. In an example, the categories module 300 compares characteristics from the data of the content items 304, such as by noting the same author or originating entity or words or phrases in the titles, among other potential sources of characteristics of the content items 304.

The word or phrase search terms may also be based on words or phrases obtained from other content items or publications from the data layer 105 and/or the network database 302. For instance, if certain words or phrases from, for instance, one company are commonly uniquely associated with that company (e.g., a trademarked term or commonly used phrase), then those certain words or phrases may be utilized to search for content items 304 without necessarily having found the word or phrase in a content item 304 in the first instance. Such words or phrases may be identified based on a standard compute search or based on a user input.

Characteristics as identified within a content item 304 or between content items 304 may first be compared against established categories 310 before proceeding to be considered for the generation of a new category. Thus, for instance, if the categories module 300 notes a keyword "Company X" in one or more content items 304, the categories module 300 may utilize the established categories module 306 to identify established categories 310 that already correspond to Company X, such as a category 310 directly related to Company X, one or more categories 310 related to an industry of Company X, one or more categories 310 related to products of Company X, one or more categories 310 related to employees of Company X, and so forth. If a relevant category 310 is identified for a particular characteristic of the content item 304 then the new category module 308 may not necessarily create a new category 310 for the content item.

The new categories module 308 may generate new categories based on the same or similar characteristics between content items 304. Thus, for instance, if multiple content items 304 include "Company Y", and the established category module 306 does not already include a category for Company Y, then the new category module 308 may create a Company Y category 310 and, variously, assign the content items 304 that reference Company Y to the Company Y category 310 or pass the Company Y category 310 to the established category module 306 which may then assign the content items 304 to the Company Y category 310.

The new category module 308 may also utilize combinations of characteristics in the generation of categories 310. Thus, for instance, if a multiple content items 304 includes words "Company X" and "John Doe", the new category module 308 may generate one or more categories 310 related to the combination. For instance, a combined Company X and John Doe category 310 may be generated. For instance, it may be inferred that John Doe is an employee of Company X, which may result in the generation of a Company X employees category 310. For instance, it may be inferred that John Doe is an analyst of Company X, which may result in the generation of a Company X analysts category 310, and so forth.

The inferring of category combinations may be based on additional words or phrases. For instance, if content items 304 that include Company X and John Doe also include the words or phrases "CEO" and/or "chief executive officer," it may be inferred that John Doe is both an employee and a chief executive officer of Company X, and one or more categories 310 may be generated accordingly. The categories module 300 may utilize a user input to resolve ambiguous combinations. Thus, the categories module 300 may present certain proposed categories to a user for input if the proposed category is consistent with reality; if the user knows that John Doe is not, in fact, CEO of Company X the user may reject the proposed category. Additionally or alternatively, the categories module 300 may access third party sources of information, such as websites, articles, and the like, which may tend to identify such relationships between characteristics for confirmation of content items.

The generation of a new category (as well as the maintenance of an established category) may be based on a number of occurrences of the associated characteristics within content items 304, either as an absolute number or over a predetermined period of time. Thus, a new category 310 may not be created for every identified word or phrase of a content item 304. Similarly, the established category module 306 may eliminate categories 310 that have not had a content item 304 or a sufficient number of content items 304 associated with the category 310 in a predetermined period of time.

In various examples, a trend may be identified based on the occurrence of relevant content items 304 over a period of as little as a few minutes or over days or more. In various examples, relatively large numbers of relevant content items 304 over a time period may allow for a trend to be identified over relatively shorter time periods. Thus, if content items 304 related to a trend increase significantly or have large absolute numbers of content items 304 then the trend may be identified within a few minutes of the beginning of the increase, while a slower increase or relatively small numbers of content items may result in the trend being identified in hours or days or more. The particular thresholds may depend on the size and scope of the social network 100 in which the trends are to be identified.

In an example, the categories module 300 maintains or accesses a database 312 or list of characteristics of content items 304 that the categories module 300 has considered. The database 312 may be a decaying database 312, with content items 304 and their associated characteristics dropping off of the database 312 after a predetermined period of time. The database 312 may be utilized in the generation of new categories 310 and the maintenance of established categories 310.

In various examples, the accessing of the database 312 may be for the purpose of identifying a new category 310 or may be for the purpose of determining if a potential new category 310 should be generated. In the one example, the new categories module 308 may search through the database 312 for characteristics with a number of occurrences that exceed a threshold for generating a new category 310 but which does not correspond to an established category. In the another example, the new categories module 308 may obtain a content item 304 and/or the content item's 304 characteristics and cross reference the characteristics and/or combinations of characteristics against the database to identify other occurrences of the characteristics and/or combinations of characteristics. In various examples, the new categories module 308 utilizes both of the above examples in generating new categories. In various examples, the new categories module 308 also compares content items 304 and characteristics thereof directly with respect to one another without accessing the database 312.

Upon the identification of a content item 304 as including characteristics that correspond to a category 310, the categories module 300 generally may assign the content item 304 to the category 310. In an example, the categories module 300 may keep track of the content items 304 that have been assigned to each category 310 and/or when the content item 304 was assigned to the category 310. The categories may be maintained, such as by the established categories module 306, by deleting content items 304 from categories after a predetermined period of time. The predetermined period of time may be based on a variety of reference points, including a time at which the content item 304 was created in the first instance, a time at which the content item 304 was accessed by the social network 100, and a time at which the content item 304 was associated with the category 310, among other potential reference points.

Alternatively, categories 310 may not be maintained by deleting content items 304 from the categories based on the passage of time. In such circumstances, other elements of the statistics module 108 disclosed herein may account for the passage of time without the categories 310 being culled of relatively old content items 304. In various examples, the passage of time is not necessarily a factor in any aspect of the statistics module 108.

Statistic Identification

A statistic identification module 314 may be utilized to identify statistics relating to the categories 310 and that may be pertinent to the presentation of information on topics that are trending both within the social network 100 and within the system 200 generally. The statistics identification module 314 may identify such statistics (and trending topics generally) either with regard to the user to whom such statistics are to be presented or without regard to the user.

In the illustrated example, the statistic identification module 314 includes a math module 316 and a trend module 318. The math module 316 is generally configured to perform mathematical operations on and/or with respect to the categories 310 and, in various examples, the social network 100 and/or the system 200 generally. The trend module 318 may identify trends based on the output of the math module 316. It is to be understood that, in various examples, the statistic identification module 314 may perform its operations without respect to specific modules 316, 318 contained within.

The math module 316 may conduct computations related to the content items 304, such as may be included in or referenced by the database 312, the data layer 105, and/or the network 302, and the categories 310. The math module 316 may routinely cycle through the categories 310 performing computations on each in turn or in parallel. Additionally or alternatively, the math module 316 may perform computations on a category 310 based on a trigger, such as when a content item 304 is associated with or deleted from a category 310.

The math module 316 may conduct any of a variety of mathematical operations or computations as may be needed for the statistic identification module 314 to identify a statistic related to a topic. In an example, the math module 316 may identify a change in a number of content items 304 associated with a category 310. The change may be in real terms, i.e., a number of content items 304 associated with the category 310 at a first time in comparison with a number of content items associated with the category 310 at a second time; or the change may be in percentage terms from the first time to the second time; or the change may reflect three or more times, e.g., so as to reflect a rate of change in the number of content items associated with the category 310 in real terms or percentage terms; and so forth. In an example, the math module 316 may compare a number of content items 304 associated with a category 310 against a different population of content items 304, such as a population of content items associated with a different category 310, a population of content items in the database 312, a population of content items in the social network 100 generally, a population of content items in the system 200 generally, and so forth. Additional computations may be performed as desired and as are consistent with the statistics disclosed herein or any statistical relationship that may be determined regarding the content items 304 and categories 310.

The math module 316 may access information about the content items 304 that are associated and that have been associated with various categories 310 from various times. The categories 310 and/or the categories module 300 may include log information, such as in the database 312, that may indicate when content items 304 were associated with or deleted from a category 310. The statistics identification module 314 generally may maintain log information about associations with the categories 310. The math module 316 may obtain information about content items 304 within the social network 100 and/or the system 200 generally from any suitable source.

The statistic identification module 314 may utilize an output form the math module 316 to identify statistics related to the content items 304 and the categories 310. The statistic identification module 314 may utilize the trend module 318 to identify statistics related to the trending of content items 304, in particular how content items 304 are or are not being associated with categories 310. However, the statistic identification module 314 is not limited to identifying only statistics related to trending, and any of a variety of statistics related to content items 304 and categories 310 may be identified, such as a number of content items 304 that have been associated with one or more categories 310, a number of categories 310 that have content items 304 associated with them, and so forth.

The trend module 318 is configured to identify trends with respect to the content items 304 and the categories 310 and, by extension, trends in topics that are related to the content items 304 and categories 310, as disclosed herein. The trend module 318 may utilize output from the math module 316 and interpret the output in terms of trends. In various examples, the trend module 318 requests computations from the math module 316 in order to identify trends in the content items 304 and/or categories 310. In such examples, the trend module 318 may request particular computations for particular categories 310 and/or content items 304. In various examples, the trend module 318 does not necessarily request computations from the math module 316 but instead analyzes the output from the math module 316 for relevant trends.

The trend module 318 may incorporate various filters and/or thresholds in identifying trends. In various examples, the trend module 318 may be programmed with or may establish minimum thresholds for identifying trending categories 310 and, by extension, topics. In an example, a category 310 may have a minimum change in associated content items 304 to be identified as trending. In an example, a category 310 may have a minimum number of associated content items 304 to be identified as trending. In an example, a category 310 may have a minimum percentage of content items 304 of a larger population of content items 304 (e.g., the content items 304 associated with the category 310 may account for a minimum percentage of total content items 304 accounted for in the database 312, the social network 100, and/or the system 200). The various thresholds may depend on a size of the total population of content items 304 accounted for, a diversity of topics and/or categories 310, and so forth, and may be updated as such factors change. In various additional examples, thresholds may also apply to the rate of change of content items 304 associated with a category 310 (e.g., a trend and/or related category 310 may have a minimum rate of change before being identified as trending.

The trend module 318 may identify trends, such as the rate of change, in categories 310. Such identification may be based the computations form the math module 316 directly. Such identification may not be with respect to a user to whom the trends are presented, e.g., by generating trends without respect to outside factors, such as an origin of the content items 304 and/or characteristics of a user of the social network 100 to whom the statistics concerning the trend are to be presented. Alternatively, the trend module 318 may factor in characteristics of the category 310 and/or an origin or other factor from a history of content items 304 associated with the category 310.

In an example, the trend module 318 accesses or includes a ranker module 320. In various examples, the ranker module 320 obtains multiple statistics related to trends form the trend module 318 and ranks the statistics and/or trends (herein after collectively referred to as trends) according to various criteria. In an example, the ranker module 320 ranks trends according to a rate of change of the trends; thus, trends that correspond to categories with the highest rate of new content items 304 being added are ranked the highest. In various examples, the ranker module ranks or further ranks trends according any of a variety of other statistics as computed by the math module 316.

In various examples, the ranker module 320 ranks trends according to a weight of multiple factors from the math module 316. In an example, the ranker module 320 applies a first weight to the rate of change and a second weight to number of content items 304 in the category 310. In such an example, the rate of change and the number of content items 304 may be normalized prior to being weighted; i.e., the rate of change may be given a first value (e.g., a percent increase in content items 304 over a period of time from zero to approximately fifty (50) percent may be given a value of "1", a percent increase in content items 304 from approximately fifty (50) percent to one hundred (100) percent may be given a value of "2", and so forth) and the number of content items 304 may be given a second value (e.g., from one thousand (1,000) to ten thousand (10,000) content items 304 in the category 310 may be given a value of "1", from ten thousand (10,000) to fifty thousand (50,000) content items 304 may be given a value of "2", and so forth). The values may then be weighted (e.g., the rate of change value may be multiplied by three (3) while the number of content items 304 value may be multiplied by one (1)). It is to be recognized that the values and weights may be adjusted as desired to promote particular types of trends (e.g., trends that are quickly gaining in popularity with less regard to their total exposure versus trends that already have wide exposure with less regard to their rate of change). While the above examples focus on two products of the math module 316, it is to be understood that the principles described may be scaled to any number of products of the math module 316 and any of a variety of weighting priorities.

The ranker module 320 may additionally factor in characteristics of the user to whom the trends are to be presented. The trends may be further weighted according to characteristics of the trends and related categories 310 and one or more characteristics of the user from the profile database 110. The ranker module 320 may be provided with an identifier of the user to whom the trend is to be presented and access the profile database 110 for characteristics of the user and utilize the characteristic of the user in comparison with the category to weight the associated trend.

For instance, a trend may be weighted low to zero for trends with characteristics that to not match well to characteristics of the user. For instance, a trend associated with a category related to Company X in the semiconductor chip manufacturing industry may be weighted zero to low for a user in an industry that does not manufacture or typically utilize semiconductor chips. By contrast, a trend may be weighted high if it has characteristics that are related to the user. Thus, in the above example, if a user works for Company X then the associated trend may be weighted high. The weighting for relevance to characteristics of the user may be multiplicative with the above example; thus, for instance, if the characteristic of the trend is a very poor match with the characteristic of the user and the weight is zero (0) then it may be impossible for the trend to be displayed to the user. Alternatively, the match between the characteristic of the trend and the user may be one factor among the other weighted factors described above; thus, an extremely popular and rapidly changing trend may be presented to a user regardless of whether or not a characteristic of the trend relates to a characteristic of the user (e.g., whether or not the trend is pertinent to the user).

Influencers

The trend module 318 may further include or access an influencers module 322. The influencers module 322 may identify users of the social network 100 who are relatively influential as an "influencer". The identification of a user as an influencer may be a binary determination or may be relative, which is to say that certain influencers may be assessed as being more influential than other influencers. Additionally or alternatively, the influencers module 322 may assess some or all users of the social network 100 and the result applied consistent with the disclosure herein. In various examples, a user who is tagged as an influencer may meet a certain threshold and thus, in such examples, certain users may be tagged as influencers while other users may not be tagged as influencers. On the basis of the status of a user as an influencer, or on the basis of a total amount of influence of a user, the relationship of the user/influencer to a content item 304 that has been associated with a category 310 may be utilized by the trend module 318 and/or the ranker module 320 in the identification of trends. Additionally or alternatively, the output of the influencers module 322 may be utilized as standalone data that may be presented to users of the social network 100 to show influencers on a user interface.

The influencers module 322 utilizes information from the data layer 105 to identify an influence of a particular user. In an example, the influencers module 322 may utilize data from the profile database 110 to identify characteristics of the user that may indicate influence. For instance, if a user's profile indicates that the user is a company executive then the user may be deemed to be relatively more influential than a user who is not an executive. A user who is an alumnus of a prestigious university may be deemed to be relatively more influential than a user who is not an alumnus of a prestigious university. A user who is a high ranking public or elected official may be deemed to be relatively more influential than a user who is not. These characteristics are exemplary and it is to be recognized that any of a variety of profile characteristics of the user may be assessed as increasing or decreasing a user's influence determination.

The influencers module 322 may receive inputs to aide in assessing the significance of influence impact of profile characteristics. The influencers module 322 may assess online databases via the Internet 302 to, for instance, assess the prestige of a university. The influencers module 322 may search online articles for confirmation of a profile characteristic of the user. The influencers module 322 may also receive user inputs to confirm an estimated or assumed influence significance of a profile characteristic, such as by prompting an administrator of the social network 100 as to an influence significance of particular profile characteristics.

The influencers module 322 may utilize information from the social graph database 112 to determine an influence of a user. In various examples, a user with a relatively large number of connections in their social graph and/or a relatively large number of associated groups may be relatively more influential than a user with a relatively smaller social graph and/or relatively few associations. A user who is connected with a relatively large number of influencers may also be deemed to be relatively more influential than a user who is connected with relatively few influencers.

In an example, the influencers module 322 may utilize information from the member activity and behavior database 114, in particular related to previous interaction by users of the social network 110 with content items 304 and the interactions of other users of the social network 100 with the content items 304 that the user has interacted with. For instance, if a user posts a content item 304, such as an article, to the social network 100, a reaction of other users of the social network 100 to the content item 304 may indicate a degree of influence of the user who posted the content item 304. A content item 304 that is viewed or otherwise accessed, commented on, gave an indication of approval for or "liked" the content item, shared or reposted on the social network 100, and/or forwarded or otherwise provided to individuals outside of the social network 100 by relatively large numbers of other users may be of relevance to the influence level of the user who posted the content item 304 to the social network 100. Even if the user wasn't the first user to post the content item 304 to the social network 100, the reaction of other users of the social network 100 to the content item 304 after the content item 304 was posted or reposted by the user may be of relevance to the influence level of the user.

One or more characteristics of the other users of the social network 100 who interact with the content items 304 may be indicative of the influence of the user who posted the content item 304. For instance, an interaction with a content item 304 by a CEO or other corporate executive may be indicative of a greater degree of influence by the user who posted the content item 304 than if the user who interacted with the content item 304 was not a corporate executive. The factors for identifying an influencer based on characteristics of the user who posted the content item 304 may be utilized in determining a degree of influence of the individuals who interacted with the content item 304. Thus, if a user who interacts with the content item 304 is a corporate executive or an alumnus of a prestigious school then that status may reflect on the influence of the user who posted the content item 304. Such characteristics of the interacting users may be assessed and weighted in the same or similar manner as the characteristics of the posting users and utilized to determine a statistic, such as an aggregate or average influence of users who interact with content items 304 as posted by the user. Additionally or alternatively, the interacting users may be assessed for whether or not the interacting user is an influencer. The characteristic of the interacting users may be factored in, such as a weighted factor, to determine the influence of the posting user, as disclosed herein.

A user whose posts of content items 304 generate relatively large levels of interaction by other users of the social network 100 may be an influencer. Further, a user who posts relatively large number of content items 304 may be an influencer even if the average posting does not necessarily generate relatively large amounts of interaction. A user who has a large number of posts of content items 304 only a relatively few of which receive large numbers of interactions by other users may nevertheless be an influencer, and a user who has relatively large numbers of posts that generate consistently moderate levels of interaction by other users may also nevertheless be an influencer or may have activity data that indicates relatively high influence. A user who posts relatively few content items 304 that generate relatively low or moderate numbers of interactions or who posts relatively large numbers of content items 304 that generate relatively low numbers of interactions may not be an influencer or may have activity data that indicates relatively low influence.

The factors from the databases 110, 112, 114 disclosed above may be individually determinative. Thus, for instance, to the extent that even a relatively famous or widely respected user, who thus has relatively high influence levels from the profile database 110 and the social graph database 112, posts relatively few content items 304 and the content items 304 generate relatively little interaction, the user may be judged to not be an influencer. Alternatively, the factors from the databases 110, 112, 114 may be cumulatively determinative. Thus, for instance, the relatively famous or widely respected user described above may be an influencer even if the user posts relatively few content items 304 that are not widely interacted with.

The factors from the databases 110, 112, 114 may be assigned values in a manner the same or similar to that applied by the ranker module 320 to statistics and math computations described above. The values may be weighted to favor certain factors over others. Thus, the data from the profile database 110 may be assigned points for the prestige of the user's university, employer, and/or job title, and so forth, such as variously one (1) to five (5) points spanning from a relatively nondescript university to a relatively prestigious university, and so forth. The social graph data may be assigned a value of "1" for a number of contacts from one (1) to two hundred (200), a value of "2" for a number of contacts from two hundred and one (201) to five hundred (500), a value of three "3" for a number of contacts from five hundred and one (501) to one thousand (1,000), and so forth. A data from the member activity and behavior database 114 may be assigned values both for a number of posts of content items 304 and for a number of interactions with the content items 304 as posted by other users of the social network, as disclosed herein. For instance, the value may be "1" for every post or every several posts the users has made over a predetermined period of time, such as three (1) months or one (1) year, and the value may be "1" for every ten (10) "likes", every five (5) comments received, every one (1) to three (3) reposts or shares, and so forth.

The values as obtained for each set of data from the databases 110, 112, 114 may be weighted. Thus, a various data and values derived therefrom may be weighted more heavily than others. The values may be weighted according to the database 110, 112, 114 they were derived from or may be weighted individually and without necessarily factoring in their database 110, 112, 114 or origin. For instance, member activity and behavior data may be weighted by multiplying the values by three (3), the profile data may be weighted by multiplying the values by two (2), and the social graph data may be unchanged by weighting. It is to be recognized and understood that the values and weights are merely example values and weights and that implementation may depend on the nature of the social network 100 and goals of the social network administrators in identifying influencers.

Where influencers are identified on a binary basis (e.g., a user is either an influencer or is not an influencer), an influencer may be identified by exceeding a cumulative threshold for the value determined above. Additionally or alternatively, administrators of the social network may set a predetermined number of influencers or percentage of the total users of the social network 100 who will be made influencers. Thus, for instance, if the predetermined percentage is 0.1% of all users are influencers, then the influencers module 322 may determine the influence value for some or all of the users of the social network 100 and assign the users with the 0.1% highest values as influencers. The same principle applies if a fixed number of influencers is established.

Direct input, such as from a social network 100 administrator, may assign influencer status. Thus, for instance, if an individual known to be highly influential in society at large were to join the social network 100, that individual may simply be granted the status of "influencer" without necessarily factoring in the values described herein. Additionally or alternatively, an administrator input may be factored in as a value like other values, e.g., by giving the user in question a "bonus" or related concept.

The output of the influencers module 322 may be utilized by the ranker module 320 and/or the statistics module 108 in general in the ranking of trends. A trend that corresponds to a category 310 having associated content items 304 that have been interacted with by a relatively disproportionate number of influencers and/or users who have relatively large or above average influence values as determined above may be ranked higher than otherwise equivalent trends that have not received the attention of influencers. In various examples, the impact of influencers and influence values on the operation of the ranker module 320 may vary.

For instance, where the identification of influencers is binary, the ranker may give bonus value points or increase a ranked position of a trend based on a number of influencers who have posted content items 304 associated with the trend. The bonus value points may be additive or multiplicative. It is noted that, in the multiplicative case, the impact of the interaction of influencers may have an exponential impact on the rank of the trend.

Where the identification of influencers is based on influence value, the influence values of the users who have posted or interacted with the content items 304 associated with the category 310 of the trend may be factored in as values themselves. Thus, the ranker 320 may assess the influence values as the other values used in ranking as disclosed herein.

Additionally or alternatively, an average or median influence value of a user who has interacted with a content item 304 associated with the trend may be compared against an average influence value for a user of, for instance, the social network 100 generally or a subset of such users, and utilized to weight the trend. For instance, if the average user associated with the trend has a ten (10) percent higher influence value than the average user of the social network 100 then the trend may be weighted by one hundred ten (110) percent. It is to be recognized that alternative statistical relationships may be utilized account for influence in the ranking of trends by the ranking module 320.

As noted herein, the output of the influencers module 322 may additionally be utilized by the social network 100 without respect to ranking trends. A user who is identified as an influencer may be noted as such when data related to the user is displayed on user interfaces. Thus, for instance, an influencer's profile may include a phrase or icon indicating that the user is an influencer, and posts by the influencer may include the same or a similar icon, and so forth.

The processes described above with respect to an influencer general to the social network 100 may be applied with respect to particular trends or categories 310. Thus, a user may be identified as an influencer with respect to a particular category 310 based on the interaction with other uses of the social network 100 to content items 304 associated with that particular category 310 and without respect to content items 304 not associated with that particular category. Other general factors detailed above may be applied with respect to the particular category 310. Thus, an executive from an industry related to the particular category 310 may be more likely to be an influencer in the particular category 310 than an executive from a different industry or than the executive from the industry may be to a different category 310 related to a different industry.

As will be illustrated herein, influencers may be denoted on a user interface. Additionally or alternatively, the social network 100 in general may facilitate interaction by other users of the social network 100 with the influencer, such as by specially presenting content items 304 from the influencer to the user or by recommending that the user "follow" the influencer and have some or all of the influencer's content items 304 specially presented to the user. Additionally or alternatively, the influencer may be requested to or may be prompted by the social network 100 or administrators of the social network to post content items 304. Such content items 304 may be featured content items 304 or otherwise presented on the social network 100 as special content items 304.

User Interface

Figure 4:
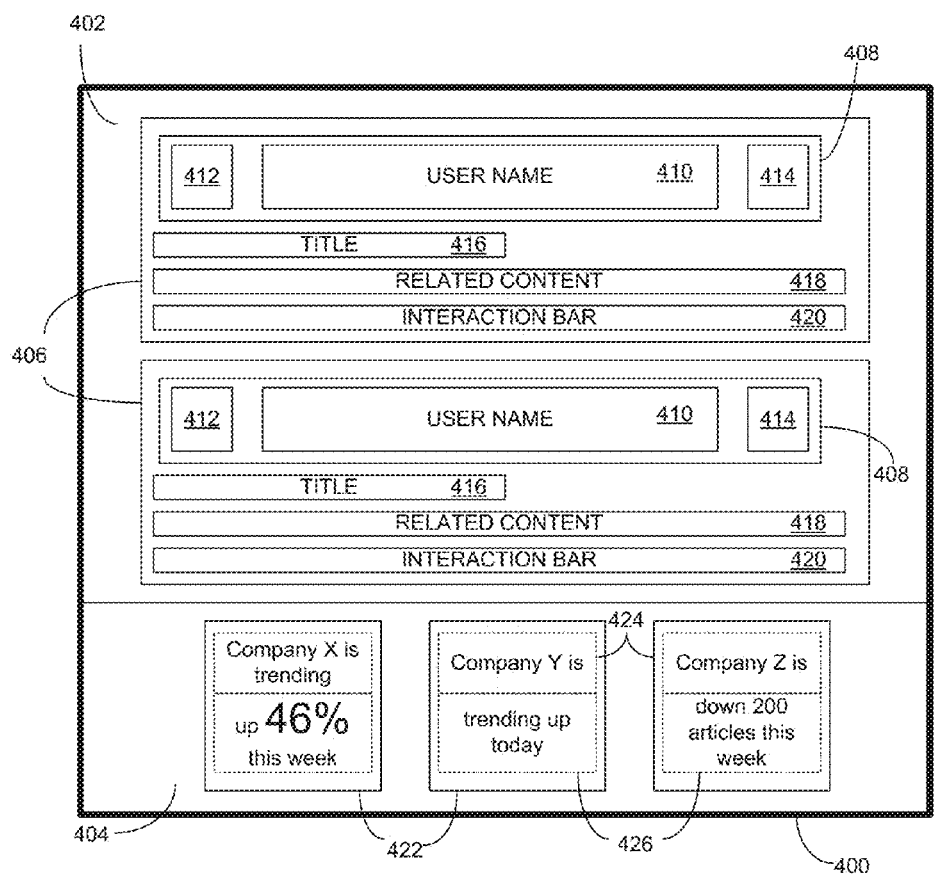
FIG. 4 is a depiction of a user interface including information related to trends and influencers, in an example embodiment.

FIG. 4 is a depiction of a user interface 400 including information related to trends and influencers. The user interface 400 may be the user interface 204 or may be displayed on the user interface 204, or may be displayed on any suitable system or platform. The user interface 400 may be from a webpage, application or program, or other source of a graphical user interface. The user interface 400 is not exhaustive of what may be included in a user interface 400 as generated by the social network 100.

In the illustrated example, the user interface 400 includes a newsfeed 402 and a trend window 404. While in the user interface 400 as illustrated the trend window 404 is separate from the newsfeed 402, in various examples the trend window 404 may be presented as part of the newsfeed 402. As noted, the user interface 400 may further include portions that are not illustrated, including menus, additional windows, advertisements, and the like.

The newsfeed includes content items 406, such as may be the graphic manifestation of the content items 304. The content items 406 include a user identifier 408 corresponding to the user who posted the content item. As illustrated, the user identifier includes a user name 410 and optionally a user image 412, such as a photograph or other associated avatar, and an influencer identifier 414.

The influencer identifier 414 may be utilized to show which users are judged as being influencers, as disclosed herein. The influencer identifier 414 is a binary indicator and, as such, may be applicable to examples disclosed herein in which influencers are positively identified. The influencer identifier 414 may be text or an icon or image. Additionally or alternatively, the influencer identifier 414 may be supplemented by or replaced with alternative mechanisms for identifying influencers, such as by changing a font, size, or color of the user name 410 for influencers or by adding a graphic to the user image 412, such as by adding a badge or other symbol to the user image 412.

In examples where an influence value is determined for users but a binary determination of influencer status is not determined or assigned, the influencer identifier 414 may be omitted or may be replaced with a non-binary indicator that corresponds to the influence value. In an example, the influence value of the user may be displayed as the influencer identifier 414. In an example, a relatively more granular indication may be presented, such as a percent rank of the user among a larger population of users, such as all users of the social network 100. In such an example, the influencer identifier 414 may be, for instance, "top 10%" for users who have among the top ten (10) percent of influence values. The granularity of the influencer identifier 414 may be selectable.

The content item 406 further includes a title 416, related content 418, and an interaction bar 420. The title 416 may be a title previously associated with the content item 406, such as a title of a corresponding webpage, article, video, and so forth. The related content 418 may be content associated with the content item 406, such as a summary, an image, a link, a file for download, and the like, and/or a combination thereof. The interaction bar 420 may provide an interface for other users to interact with the content item 406, such as by "liking" the content item 406, commenting, sharing or reposting the content item 406, and so forth.

The trend window 404 includes trend displays 422, each trend display 422 displaying information relating to at least one trend. The trend displays 422 include a descriptor 424 and a statistic 426. The descriptor 424 includes language or symbols describing the trend, such as a title that may correspond to the category 310 from which the trend derives or with which the trend is associated, as well as optional linking words or phrases to lead grammatically to the statistic 426. Thus, the descriptor 424 may read "Company X is trending" or "John Doe of Company Y" or "Industry Z is".

The statistic 426 may be a statistic as generated by the math module 316, as disclosed herein. If the math module 316 previously identified a percentage change in the number of content items 304 associated with the category 310 over a predetermined period of time, then the statistic 426 may reflect one or more of the percentage change and the predetermined period of time, as well as optional additional language to make the. Thus, in various examples, the statistic 426 may be "up 46% over the last day" or "trending over the last week" or "down 200 articles this week". Combined, the descriptor 424 and the statistic 426 may, in certain circumstances, create a grammatically correct phrase or sentence. Alternatively, the descriptor 424 and the statistic 426 may create a non-grammatically correct, truncated phrases and/or may use symbols, such as arrows and the like to indicate a direction of a trend (i.e., increasing or decreasing), or icons, pictures, logos or the like to indicate a person, article, company, group, organization, and so forth. Thus, rather than necessarily spelling "Company X" in text, a logo of Company X may be utilized in addition or instead.

As illustrated, there are three trend displays 422, each displaying a different trend. It is to be understood that more or fewer trend displays 422 may be displayed in the trend window 404. The trends displayed in the trend window 404 may, in various examples, correspond to the most highly ranked trends as identified by the ranker module 320. Alternatively, the trends as displayed may be in part random and/or in part based on a user selection of which trends to display. The display of the trends in the window 404 may likewise be ranked in various examples, with the most highly ranked trend displayed in a most prominent display 422, such as a left-most display 422, with the lower ranked trends displayed sequentially in the less prominent positions. It is to be understood that the prominence of various displays 422 may vary depending on the layout of the window 404 and the cultural norms and customs of the user to whom the trends are to be displayed.

In various examples, administrators of the social network 100 may curate the user interface 400 generally and the trend displays 422 in particular. Trend displays 422, for instance, may be reviewed for grammar and form, such as to correct errors or make the user interface 400 clean or arranged as desired. The administrator may further or additionally add description to trend topics 422 or otherwise adjust the trend topics 422 as desired.

Flowcharts

Figure 5:
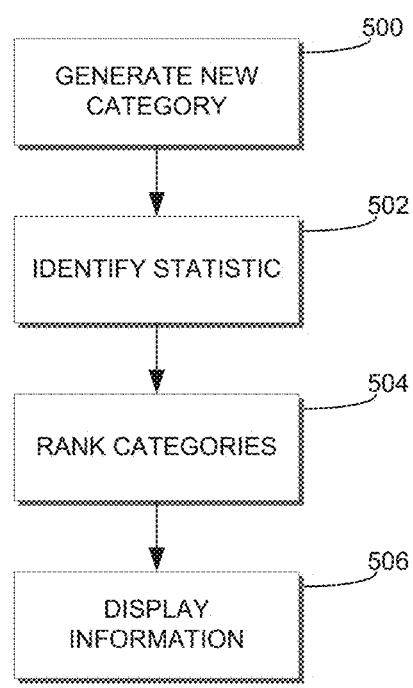
FIG. 5 is a flowchart for displaying a statistic related to a category, in an example embodiment.

FIG. 5 is a flowchart for displaying a statistic related to a category. The flowchart may be performed with any of a variety of devices and systems disclosed herein, as well as with any suitable system known in the art.

At operation 500, a new category different than an established category is generated. The established category is associated with a first subset of content items. The content items are stored in a database. The new category is associated and related to a second subset of the content items based, at least in part, on a relationship of the content items of the second subset with respect to one another. In an example, the relationship is identified based, at least in part, on at least one of a common word and a common phrase in the content items. In an example, the relationship is identified based, at least in part, on a user input. In an example, the user input selects at least one of a word and a phrase common among the at least one of the first and second subsets of content items. In an example, the user input selects a content item for inclusion in the at least one of the first and second subsets.

At operation 502, a statistic is identified that is related to an inclusion of at least some of the content items of at least one of the first subset and the second subset into a social network by users of the social network. In an example, the statistic is related to a change in the inclusion of the at least some of the content items of at least one of the first subset and the second subset into the social network over time. In an example, the information related to the statistic is a trend in a rate at which the content items are associated with the at least one of the first subset and the second subset. In an example, the statistic is related to a total number of the at least some of the content items in comparison with a different group of content items than the at least some of the content items of at least one of the first subset and the second subset. In an example, identifying the statistic includes identifying a first statistic related to the first subset and a second statistic related to the second subset.

At operation 504, the established category and the new category are ranked based, at least in part, on the first and second statistics and cause the display information related to at least one of the first and second statistics based, at least in part, on the rank. In an example, the rank is further based, at least in part, on an influence of a user who caused, at least in part, at least one of the content items of at least one of the first subset and the second subset to be included in the social network. In an example, the influence is based, at least in part, on an interaction with other users of the social network with the at least one of the content items that the user caused to be included in the social network.

At operation 506, information related to the statistic is caused to be displayed on a user interface.

Figure 6:
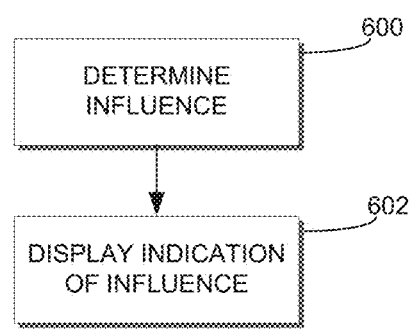
FIG. 6 is a flowchart for displaying social network analytics on a user interface, in an example embodiment.

FIG. 6 is a flowchart for displaying social network analytics on a user interface. The flowchart may be performed with any of a variety of devices and systems disclosed herein, as well as with any suitable system known in the art.

At operation 600, an influence of a first user is determined based, at least in part, on: an interaction by the second user with at least one of a plurality of content items introduced to a social network and stored on a database by the first user; and a characteristic of the second user. In an example, the characteristic of the second user is at least one of an occupation, a title, an educational background, an industry, a skill, a company, an organization, a demographic characteristic, an age, a gender, a location, and an influence status. In an example, the influence of the first user is determined based on characteristics of a plurality of second users who have interacted with the at least one of the content items.

In an example, the influence of the first user is determined based, at least in part, on an influence of the second user. In an example, the influence of the first user is further determined based, at least in part, on a characteristic of the first user. In an example, the characteristic of the first user is at least one of an occupation, a title, an educational background, an industry, a skill, a company, an organization, a demographic characteristic, an age, a gender, a location, and an influence status. In an example, the influence of the first user is further determined based, at least in part, on a number of connections of the first user in the social network. In an example, the influence of the first user is determined based, at least in part, on a number of interactions with at least one of the content items by a plurality of second users. In an example, the interaction is at least one of accessing the content item, an indication of approval of the content item, a comment on the content item, a reposting or sharing of the content item, and forwarding the content item outside of the social network. In an example, the influence of the first user is determined based on the interaction of the second user and a weighted average of at least some of a characteristic of the first user, a number of connections of the first user, and a number of interactions with at least one of the content items by a plurality of second users.

At operation 602, an indication of the influence of the first user to be displayed on a user interface.

System

Figure 7:
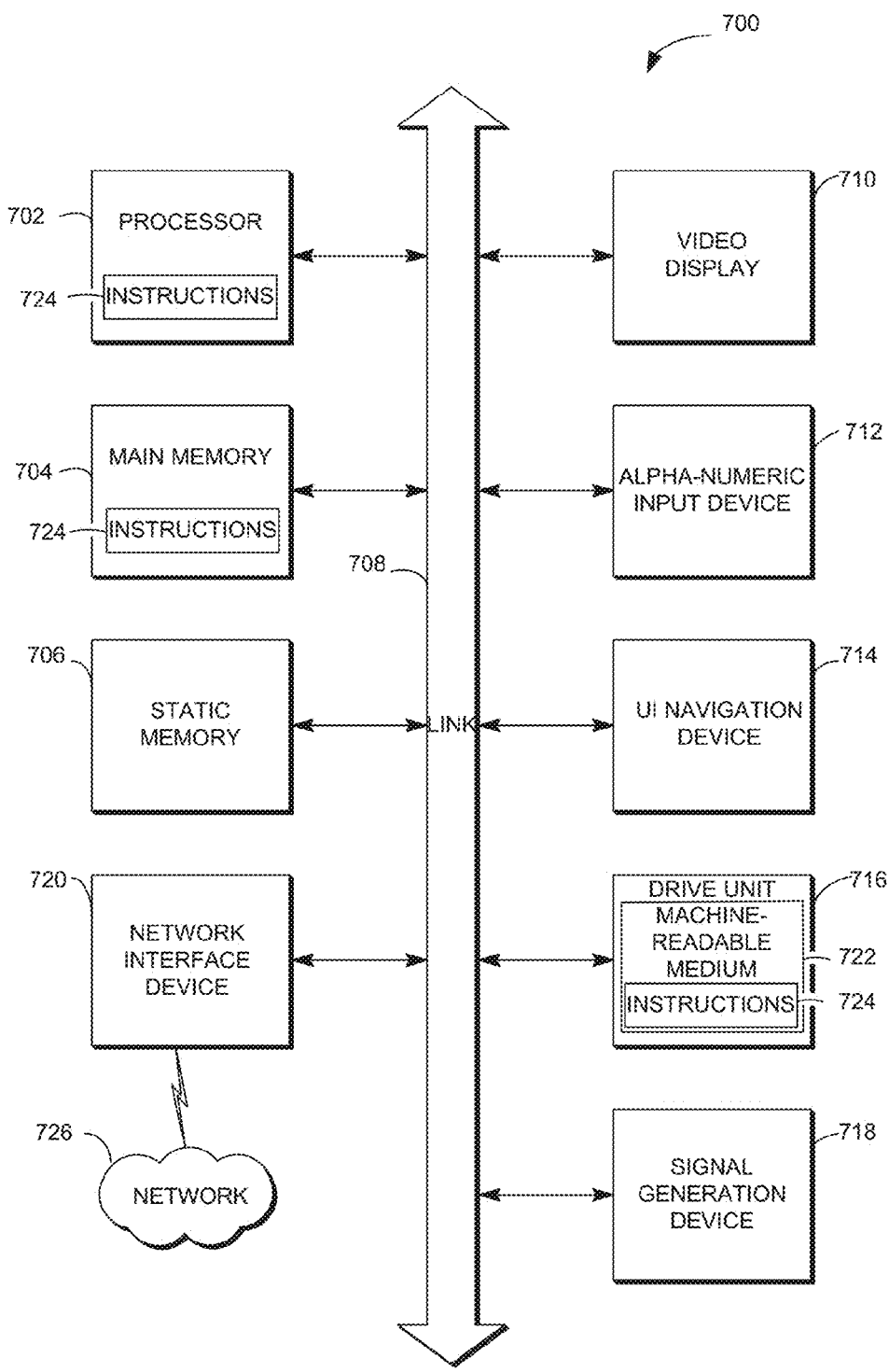
FIG. 7 is a block diagram illustrating components of a machine able to read instructions from a machine-readable medium.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system and within which instructions 724 (e.g., software) for causing the machine 700 to perform any one or more of the methodologies discussed herein may be executed. In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The machine 700 may further include a graphics display 710 (e.g., a plasma display panel (PDP), a light emitting diode (LED) display, a liquid crystal display (LCD), a projector, or a cathode ray tube (CRT)). The machine 700 may also include an alphanumeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a speaker), and a network interface device 720.

The storage unit 716 includes a machine-readable medium 722 on which is stored the instructions 724 (e.g., software) embodying any one or more of the methodologies or functions described herein. The instructions 724 may also reside, completely or at least partially, within the main memory 704, within the processor 702 (e.g., within the processor's cache memory), or both, during execution thereof by the machine 700. Accordingly, the main memory 704 and the processor 702 may be considered as machine-readable media. The instructions 724 may be transmitted or received over a network 726 via the network interface device 720.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 700), such that the instructions, when executed by one or more processors of the machine (e.g., processor 702), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

In Example 1, a system includes an electronic data storage configured to store content items introduced to a social network by a first user and to store interactions with the content items by second user of the social network and a processor, coupled to the electronic data storage, configured to determine an influence of the first user based, at least in part, on the interaction by the second user with at least one of the content items as introduced by the first user and a characteristic of the second user and cause an indication of the influence of the first user to be displayed on a user interface.

In Example 2, the system of Example 1 optionally further includes that the characteristic of the second user is at least one of an occupation, a title, an educational background, and an influence status.

In Example 3, the system of any one or more of Examples 1 and 2 optionally further includes that the influence of the first user is determined based on characteristics of a plurality of second users who have interacted with the at least one of the content items.

In Example 4, the system of any one or more of Examples 1-3 optionally further includes that the influence of the first user is determined based, at least in part, on an influence of the second user.

In Example 5, the system of any one or more of Examples 1-4 optionally further includes that the influence of the first user is further determined based, at least in part, on a characteristic of the first user.

In Example 6, the system of any one or more of Examples 1-5 optionally further includes that the characteristic of the first user is at least one of an occupation, a title, an educational background, and an influence status.

In Example 7, the system of any one or more of Examples 1-6 optionally further includes that the influence of the first user is further determined based, at least in part, on a number of connections of the first user in the social network.

In Example 8, the system of any one or more of Examples 1-7 optionally further includes that the influence of the first user is determined based, at least in part, on a number of interactions with at least one of the content items by a plurality of second users.

In Example 9, the system of any one or more of Examples 1-8 optionally further includes that the interaction is at least one of accessing the content item, an indication of approval of the content item, a comment on the content item, a reposting or sharing of the content item, and forwarding the content item outside of the social network.

In Example 10, the system of any one or more of Examples 1-9 optionally further includes that the influence of the first user is determined based on the interaction of the second user and a weighted average of at least some of a characteristic of the first user, a number of connections of the first user, and a number of interactions with at least one of the content items by a plurality of second users.

In Example 11, a method includes determining, with a processor, an influence of a first user based, at least in part, on: an interaction by the second user with at least one of a plurality of content items introduced to a social network and stored on a database by the first user; and a characteristic of the second user and causing, with the processor, an indication of the influence of the first user to be displayed on a user interface.

In Example 12, the method of Example 11 optionally further includes that the characteristic of the second user is at least one of an occupation, a title, an educational background, and an influence status.

In Example 13, the method of any one or more of Examples 11 and 12 optionally further includes that the influence of the first user is determined based on characteristics of a plurality of second users who have interacted with the at least one of the content items.

In Example 14, the method of any one or more of Examples 11-13 optionally further includes that the influence of the first user is determined based, at least in part, on an influence of the second user.

In Example 15, the method of any one or more of Examples 11-14 optionally further includes that the influence of the first user is further determined based, at least in part, on a characteristic of the first user.

In Example 16, the method of any one or more of Examples 11-15 optionally further includes that the characteristic of the first user is at least one of an occupation, a title, an educational background, and an influence status.

In Example 17, the method of any one or more of Examples 11-16 optionally further includes that the influence of the first user is further determined based, at least in part, on a number of connections of the first user in the social network.

In Example 18, the method of any one or more of Examples 11-17 optionally further includes that the influence of the first user is determined based, at least in part, on a number of interactions with at least one of the content items by a plurality of second users.

In Example 19, the method of any one or more of Examples 11-18 optionally further includes that the interaction is at least one of accessing the content item, an indication of approval of the content item, a comment on the content item, a reposting or sharing of the content item, and forwarding the content item outside of the social network.

In Example 20, the method of any one or more of Examples 11-19 optionally further includes that the influence of the first user is determined based on the interaction of the second user and a weighted average of at least some of a characteristic of the first user, a number of connections of the first user, and a number of interactions with at least one of the content items by a plurality of second users.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system, comprising:
 a non-transitory machine-readable storage medium comprising instructions which, when implemented by a processor, cause the processor to perform operations comprising:
 determine an influence of a first user of an online social networking system based, at least in part, on:
  determining, for each of a plurality interactions by individual ones of a plurality of second users of the online social networking system with a content item introduced to the online social networking system by the first user, a value for the interaction by the second user based on an aggregate influence score of the second user;
  calculating a cumulative influence score of the first user by combining the values as determined; and
  determining the influence of the first user based on the cumulative influence score in comparison to a threshold;
 cause an indication of the influence of the first user to be displayed on a user interface.

2. The system of claim 1, wherein the aggregate influence score of the second user is based on at least one characteristic of the second user, the characteristic being at least one of an occupation, a title, an educational background, an industry, a skill, a company, an organization, a demographic characteristic, an age, a gender, a location, and an influence status.

3. The system of claim 1, wherein the influence of the first user is determined based, at least in part, on an influence of second users.

4. The system of claim 1, wherein the influence of the first user is further determined based, at least in part, on a characteristic of the first user.

5. The system of claim 4, wherein the characteristic of the first user is at least one of an occupation, a title, an educational background, an industry, a skill, a company, an organization, a demographic characteristic, an age, a gender, a location, and an influence status, and wherein the values of the interactions are based on a relative significance of the characteristic of the first user with respect to other characteristics of the second users.

6. The system of claim 1, wherein the influence of the first user is further determined based, at least in part, on a number of connections of the first user in the social network.

7. The system of claim 1, wherein the influence of the first user is determined based, at least in part, on a number of interactions with at least one of the content items by a plurality of second users.

8. A method, comprising:
 determining, with a processor, an influence of a first user of an online social networking system based, at least in part, on:
  determining, for each of a plurality interactions by individual ones of a plurality of second users of the online social networking system with a content item introduced to the online social networking system by the first user, a value for the interaction by the second user based on an aggregate influence score of the second user;
  calculating a cumulative influence score of the first user by combining the values as determined; and
  determining the influence of the first user based on the cumulative influence score;
 causing, with the processor, an indication of the influence of the first user to be displayed on a user interface.

9. The method of claim 8, wherein the aggregate influence score of the second user is based on at least one characteristic of the second user, the characteristic being at least one of an occupation, a title, an educational background, an industry, a skill, a company, an organization, a demographic characteristic, an age, a gender, a location, and an influence status.

10. The method of claim 8, wherein the influence of the first user is determined based, at least in part, on an influence of the second users.

11. The method of claim 8, wherein the influence of the first user is further determined based, at least in part, on a characteristic of the first user.

12. The method of claim 11, wherein the characteristic of the first user is at least one of an occupation, a title, an educational background, an industry, a skill, a company, an organization, a demographic characteristic, an age, a gender, a location, and an influence status, and wherein the values of the interactions are based on a relative significance of the characteristic of the first user with respect to other characteristics of the second users.

13. The method of claim 8, wherein the influence of the first user is further determined based, at least in part, on a number of connections of the first user in the social network.

14. The method of claim 8, wherein the influence of the first user is determined based, at least in part, on a number of interactions with at least one of the content items by a plurality of second users.

15. A non-transitory machine-readable storage readable medium comprising instructions which, when implemented by a processor, cause the processor to perform operations comprising:
 determine an influence of a first user of an online social networking system based, at least in part, on:
  determining, for each of a plurality interactions by individual ones of a plurality of second users of the online social networking system with a content item introduced to the online social networking system by the first user, a value for the interaction by the second user based on an aggregate influence score of the second user;
  calculating a cumulative influence score of the first user by combining the values as determined; and
  determining the influence of the first user based on the cumulative influence score; cause an indication of the influence of the first user to be displayed on a user interface.

16. The machine-readable storage readable medium of claim 15, wherein the aggregate influence score of the second user is based on at least one characteristic of the second user, the characteristic being at least one of an occupation, a title, an educational background, an industry, a skill, a company, an organization, a demographic characteristic, an age, a gender, a location, and an influence status.

17. The machine-readable storage medium of claim 15, wherein the influence of the first user is determined based, at least in part, on an influence of the second users.

18. The machine-readable storage medium of claim 15, wherein the influence of the first user is further determined based, at least in part, on a characteristic of the first user.

19. The machine-readable storage medium of claim 18, wherein the characteristic of the first user is at least one of an occupation, a title, an educational background, an industry, a skill, a company, an organization, a demographic characteristic, an age, a gender, a location, and an influence status, and wherein the values of the interactions are based on a relative significance of the characteristic of the first user with respect to other characteristics of the second users.

20. The machine-readable storage medium of claim 15, wherein the influence of the first user is further determined based, at least in part, on a number of connections of the first user in the social network.

\* \* \* \* \*

UNITED STATES PATENT AND TRADEMARK OFFICE
CERTIFICATE OF CORRECTION

PATENT NO. : 9,990,404 B2  
APPLICATION NO. : 14/168924  
DATED : June 5, 2018  
INVENTOR(S) : Agarwal et al.

Page 1 of 1

It is certified that error appears in the above-identified patent and that said Letters Patent is hereby corrected as shown below:

On the Title Page

Item (54), and in the Specification, in Column 1, Line 2, in "Title", delete "TRENDING TOPICS" and insert --INFLUENCERS-- therefor In the Claims In Column 26, Line 63, in Claim 15, after "score;", insert --¶--

Signed and Sealed this  
Twenty-eighth Day of May, 2019

Andrei Iancu  
*Director of the United States Patent and Trademark Office*